(12) United States Patent
Saitoh et al.

(10) Patent No.: US 7,901,098 B2
(45) Date of Patent: Mar. 8, 2011

(54) ILLUMINATING APPARATUS AND IMAGE SENSING SYSTEM INCLUDING ILLUMINATING APPARATUS

(75) Inventors: Kenji Saitoh, Atsugi (JP); Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 11/761,967

(22) Filed: Jun. 12, 2007

(65) Prior Publication Data
US 2007/0292088 A1 Dec. 20, 2007

(30) Foreign Application Priority Data

Jun. 19, 2006 (JP) ................. 2006-168716

(51) Int. Cl.
*G03B 15/02* (2006.01)
(52) U.S. Cl. ............ 362/16; 362/310; 362/309; 362/335
(58) Field of Classification Search ................ 362/3, 16, 362/296.05–296.08, 308–310, 327–331, 362/335, 340; 359/633, 642, 831–834
See application file for complete search history.

(56) References Cited

U.S. PATENT DOCUMENTS

| | | | | | |
|---|---|---|---|---|---|
| 1,977,689 | A | * | 10/1934 | Muller | 340/815.76 |
| 2,254,961 | A | * | 9/1941 | Harris | 362/327 |
| 2,254,962 | A | * | 9/1941 | Bitner et al. | 362/327 |
| 2,469,080 | A | * | 5/1949 | Rosin et al. | 362/327 |
| 5,772,302 | A | * | 6/1998 | Ishikawa et al. | 362/3 |
| 5,813,743 | A | | 9/1998 | Naka | |
| 6,850,375 | B2 | * | 2/2005 | Tenmyo | 359/831 |

FOREIGN PATENT DOCUMENTS

| | | |
|---|---|---|
| JP | 04-138438 A | 5/1992 |
| JP | 08-234277 A | 9/1996 |
| JP | 08-262537 A | 10/1996 |

* cited by examiner

*Primary Examiner* — Hargobind S Sawhney
(74) *Attorney, Agent, or Firm* — Canon USA Inc IP Div (57) ABSTRACT

An illuminating apparatus includes a light source including a cylindrical light-emitting tube, a first optical system, a second optical system, and a third optical system. The first optical system has an incident surface on which light emitted from the light source to the object side are incident and an emergent surface from which the light passing through the incident surface are emitted. The second optical system has a reflecting surface from which light emitted from the light source to a first side are reflected. The third optical system has a reflecting surface from which light emitted from the light source to a second side opposite to the first side are reflected. The first to third optical systems each illuminate the entire illumination area of the object with light emitted from the light source and incident on the optical systems.

6 Claims, 14 Drawing Sheets

ILLUMINATING APPARATUS AND IMAGE SENSING SYSTEM INCLUDING ILLUMINATING APPARATUS

BACKGROUND OF THE INVENTION

1. Field of the Invention

The present invention relates to illuminating apparatuses that illuminate illumination areas of objects.

2. Description of the Related Art

To date, illuminating apparatuses for illuminating an object with light beams emitted from light sources have been used in image pickup apparatuses such as video cameras and digital cameras when the object side is in low light. Such illuminating apparatuses include a light source and optical components such as reflecting mirrors and a Fresnel lens that can efficiently guide light beams emitted from the light source forward (to the object side).

Among such illuminating apparatuses, some illuminating apparatuses can efficiently collect light beams emitted from a light source in many directions into a required illumination field angle.

Moreover, some illuminating apparatuses include optical members using total reflection such as a prism light guide instead of a Fresnel lens disposed in front of a light source so as to improve collection efficiency and reduce the size of the apparatuses.

Among these, an illuminating apparatus that illuminates an object with light beams emitted forward from a light source via a small prism having a high collection efficiency is well known (see Japanese Patent Laid-Open No. 4-138438).

The illuminating apparatus disclosed in Japanese Patent Laid-Open No. 4-138438 can markedly increase the illuminance in the vicinity of the center of the object.

Moreover, some illuminating apparatuses have an illumination optical system reduced in size by disposing a prism in the anterior position to a light source. Furthermore, some illuminating apparatuses have a light-emergent surface that receives and emits light beams perfectly reflected from a prism and is inclined with respect to an optical axis.

Among these, an illuminating apparatus having an optical member formed of a light guide located in the vicinity of a light source is well known (see Japanese Patent Laid-Open No. 8-234277). The illuminating apparatus collects light beams emitted from the light source and converts the light beams into uniformly distributed light beams using the optical member so as to illuminate a surface with a small optical loss.

The illuminating apparatus disclosed in Japanese Patent Laid-Open No. 8-234277 collects light beams in a longitudinal direction of the light source by repeating total reflection inside the light guide so as to uniformly illuminate the surface with a small optical loss.

In addition, an illuminating apparatus reduced in size by disposing a prism having an asymmetrical shape with respect to an axis of illuminating light in front of a light source is also well known (see Japanese Patent No. 3685516).

In general, when image pickup apparatuses such as cameras are used, illumination is often performed over a relatively wide range at the object side. Therefore, the directivity of illuminating beams is not carefully considered. However, expressiveness of acquired image information of objects widely differs according to differences between illuminating conditions. For example, the surface state of a specific object to be captured can be emphasized by controlling incident angles of illuminating beams with respect to the object. Moreover, in order to capture momentary images of a moving object without image blurring, an effective illumination with a short-time emission of a few to dozens of microseconds such as a strobe light is required.

In general, electronic flash devices are used as auxiliary light sources in image pickup apparatus such as cameras. In these electronic flash devices, the required light power for one image capture has been increasing. In particular, more electric power is required for illumination when images of a dark object are captured. Under such conditions, more light is required to capture images of an object located at the same distance at the same brightness. Moreover, smaller illuminating apparatuses have become required as the size of image pickup apparatuses have become smaller.

Cylindrical light-emitting sources, in particular, xenon light-emitting tubes are advantageous as light sources for high-intensity illumination. However, light-emitting tubes typified by xenon light-emitting tubes have various light power distributions in accordance with emission timing.

In a light power distribution of a light-emitting tube, a portion having a high intensity exists along the inner wall of the light-emitting tube, and the center of light emission is changed in accordance with emission timing.

Hereinafter, the light-emergent surface at this moment is referred to as a cylindrical light-emergent surface of a cylindrical light-emergent source since the vicinity of the inner wall of the light-emitting tube mainly emits light.

Figure 9:
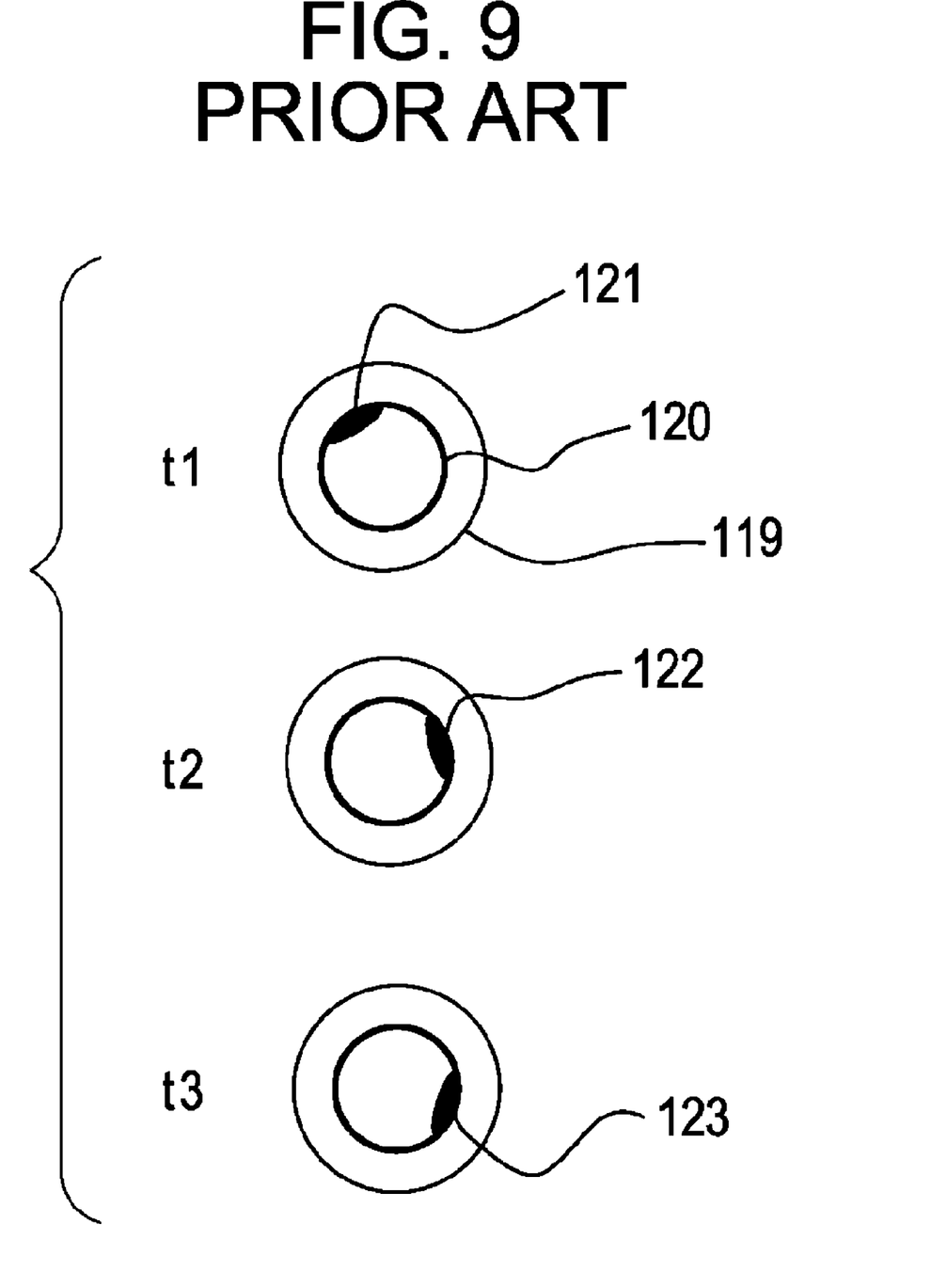
FIG. 9 illustrates light-emitting positions in a section of a light-emitting tube.

FIG. 9 illustrates light power distributions in a section of a light-emitting tube, the positions of portions with high light intensity being changed in accordance with emission timings t1, t2, and t3. At the timing t1, the center of light emission lies on a portion 121 on a light-emitting tube (inner wall of the light-emitting tube) 120. The center of light emission moves to a portion 122 at the timing t2, and moves to a portion 123 at the timing t3. When the center of light emission moves in this manner, distribution of illuminating light on an object is changed accordingly. In particular, when an object is illuminated with light beams having a directivity oblique to the object, illuminance distribution is significantly changed.

Figure 10:
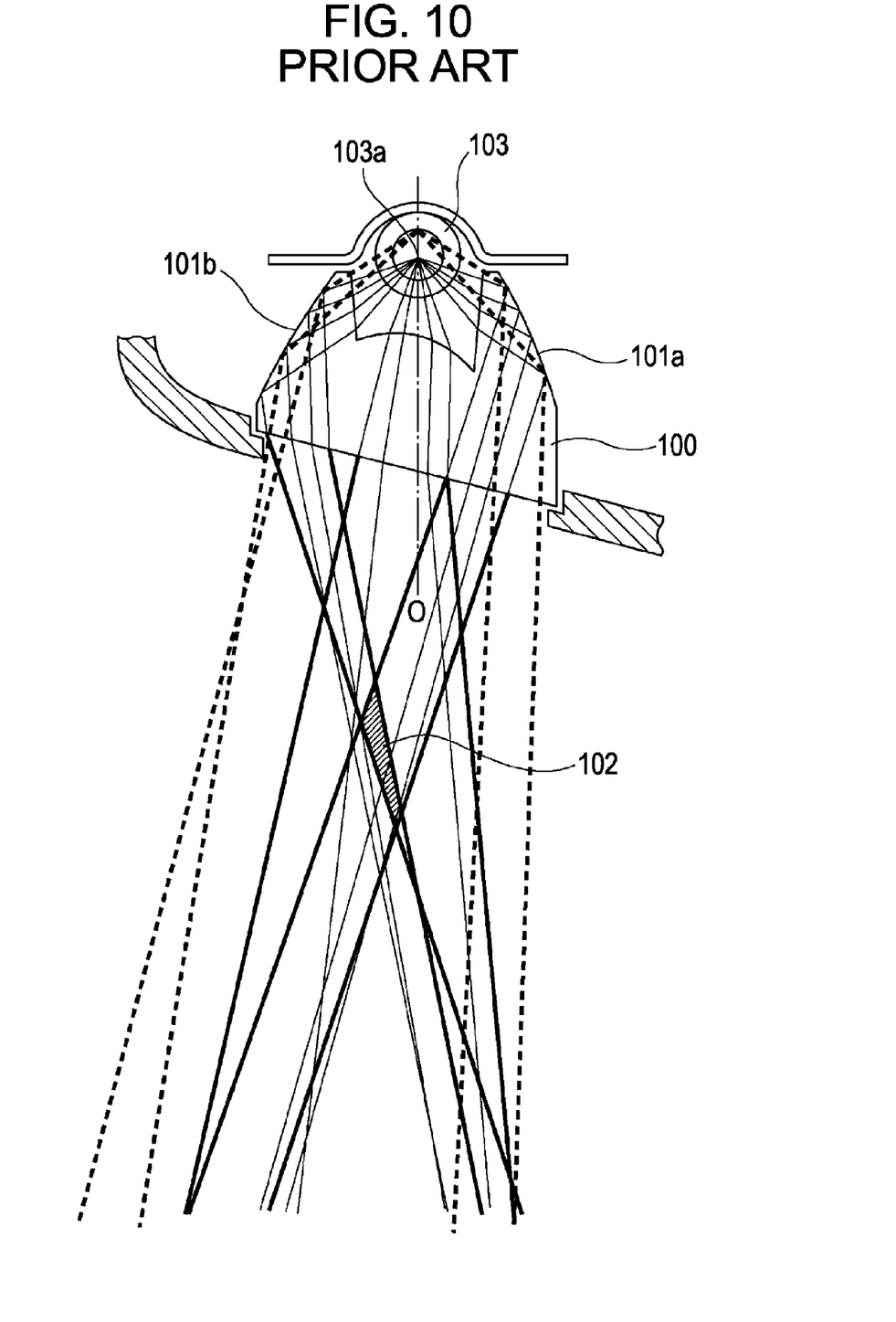
FIG. 10 illustrates a known illuminating apparatus.

In the illuminating apparatus disclosed in Japanese Patent No. 3685516, for example, a hatched portion 102 shown in FIG. 10 is the area on which light beams passing through a refracting lens 100 and light beams reflected from reflecting mirrors 101a and 101b at either side of the refracting lens 100 are incident at the same time. Light paths shown in FIG. 10 are obtained by tracing light beams emitted from the center 103a of a light-emitting tube 103. Light beams emitted from the back surface of the light-emitting tube 103 and reflected from the reflecting mirrors 101a and 101b are shown by dotted lines. As is clear from FIG. 10, areas illuminated by these light beams at the same time are not superposed. Moreover, light paths of light beams emitted from a light-emitting point located on the front surface of the light-emitting tube 103 also differ from those shown in FIG. 10. In this manner, each light-emitting point has an individual illuminating range. Therefore, when the position of the light-emitting point of the light-emitting tube 103 fluctuates, the distribution of illuminating light is widely changed in accordance with the position of the light-emitting point. Accordingly, it becomes difficult to illuminate the object efficiently and uniformly.

SUMMARY OF THE INVENTION

The present invention is directed to an illuminating apparatus capable of efficiently illuminating an illumination area of an object to be illuminated even when the position of a light-emitting point on a cylindrical light-emitting tube is changed in terms of time.

An illuminating apparatus according to an aspect of the present invention includes a light source including a cylindrical light-emitting tube, a first optical system, a second optical system, and a third optical system. The first optical system has an incident surface on which light emitted from the light source to an object side are incident and an emergent surface from which the light passing through the incident surface are emitted. The second optical system has a first reflecting surface from which light emitted from the light source to a first side are reflected. The third optical system has a second reflecting surface from which light emitted from the light source to a second side opposite to the first side are reflected. The first optical system, the second optical system, and the third optical system are each configured to illuminate the entire illumination area of an object with light beams emitted from the light source and incident on the first, second, and third optical systems.

Further features of the present invention will become apparent from the following description of exemplary embodiments with reference to the attached drawings.

DESCRIPTION OF THE EMBODIMENTS

Illuminating apparatuses according to exemplary embodiments of the present invention will now be described in detail with reference to the drawings.

First Exemplary Embodiment

Figure 1:
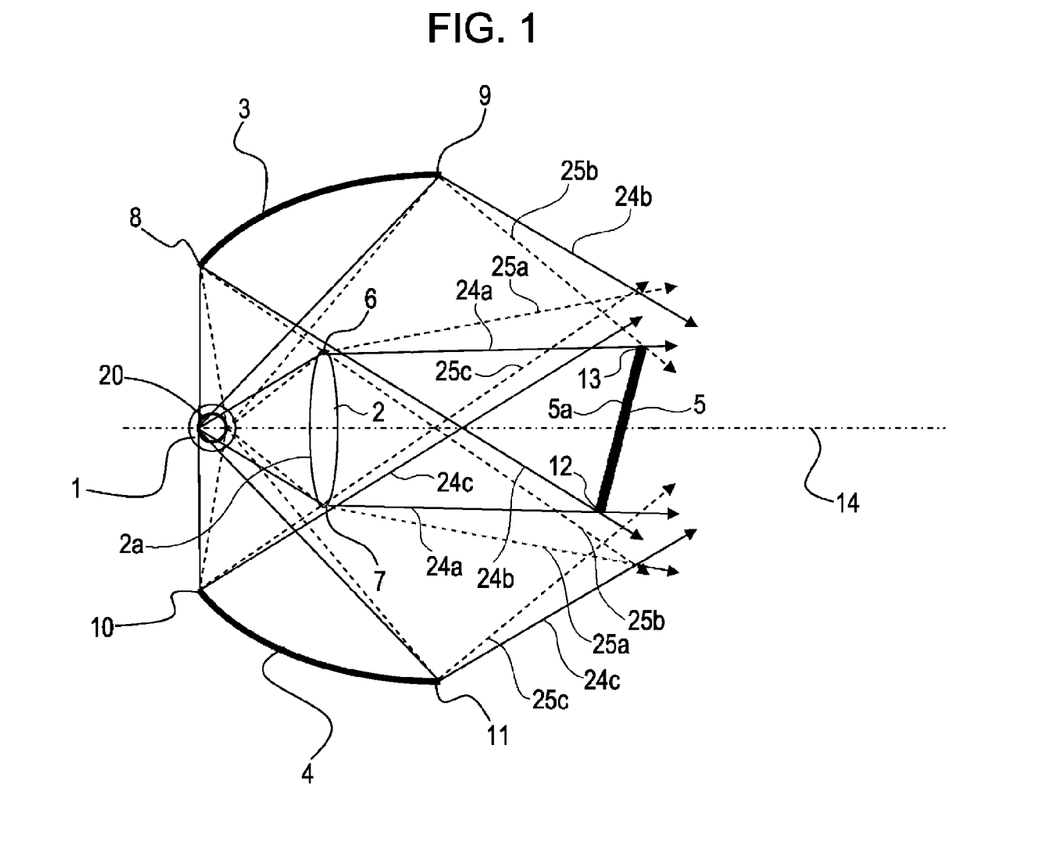
FIG. 1 illustrates a basic configuration of an illuminating apparatus according to a first exemplary embodiment of the present invention.

FIG. 1 is a cross-sectional view of a principal part of an illuminating apparatus according to a first exemplary embodiment of the present invention. FIGS. 2A to 2D illustrate a light-emitting tube shown in FIG. 1.

FIG. 1 illustrates an illuminating apparatus for illuminating an object 5 to be illuminated located in an anterior position of the illuminating apparatus with divergent beams emitted from a light source 1 formed of a cylindrical light-emitting tube. In this exemplary embodiment, the light source 1 is formed of a xenon light-emitting tube.

Figure 2A:
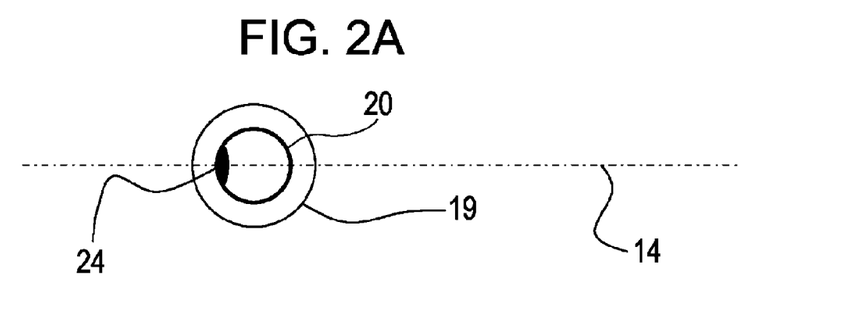
FIGS. 2A to 2D illustrate a light-emitting tube shown in FIG. 1.
Figure 2B:
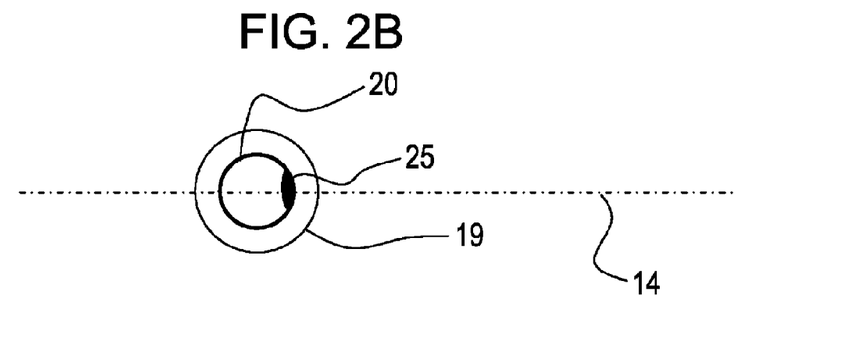

Light beams emitted from the light source 1 to the vicinity of an illumination axis 14 illuminates the object 5 via a refracting optical system 2 serving as a first optical system. Herein, the illumination axis 14 is an axis perpendicular to the axis of a light-emitting tube (inner wall of the light-emitting tube) 20 of the light source 1, and corresponds to the optical axis of the refracting optical system 2. As shown in FIG. 2A, a light-emitting point 24 is located on the illumination axis 14, and is the furthest from the refracting optical system 2 among light-emitting points of the light source 1. Moreover, as shown in FIG. 2B, a light-emitting point 25 is disposed on the illumination axis 14, and is the closest to the refracting optical system 2 among light-emitting points of the light source 1. As shown in FIG. 1, light beams 24a (solid lines) emitted from the light-emitting point 24 and light beams 25a (dotted lines) emitted from the light-emitting point 25 enter the refracting optical system 2. At this moment, the light beams 24a and 25a pass through both ends 6 and 7 of an incident surface 2a of the refracting optical system 2.

In FIG. 1, the entire illumination area (illumination range) 5a of the object 5 is illuminated with light beams including the light beams 24a and 25a emitted from the light source 1 as marginal rays. The illumination area 5a has ends 12 and 13.

Moreover, parts of the light beams emitted from the light-emitting point 24 disposed on the illumination axis 14 to a first side (upward in this case) at a large angle illuminate the object 5 via a first reflecting optical system 3 serving as a second optical system. At this moment, light beams 24b (solid lines) emitted from the light-emitting point 24 and light beams 25b (dotted lines) emitted from the light-emitting point 25 pass through both ends 8 and 9 of an incident surface of the first reflecting optical system 3. As shown in FIG. 1, the entire illumination area 5a of the object 5 is illuminated with light beams including these light beams 24b and 25b as marginal rays.

Furthermore, parts of the light beams emitted from the light-emitting point 24 disposed on the illumination axis 14 to a second side (downward in this case) at a large angle illuminate the object 5 via a second reflecting optical system 4 serving as a third optical system. At this moment, light beams 24c (solid lines) emitted from the light-emitting point 24 and light beams 25c (dotted lines) emitted from the light-emitting point 25 pass through both ends 10 and 11 of an incident surface of the second reflecting optical system 4. As shown in FIG. 1, the entire illumination area 5a of the object 5 is illuminated with light beams including these light beams 24c and 25c as marginal rays.

With this structure, divergent beams emitted from the light-emitting points 24 and 25 of the light source 1 can illuminate the entire illumination area 5a of the object 5 via the refracting optical system 2, the first reflecting optical system 3, or the second reflecting optical system 4.

In FIGS. 2A to 2D, a reference number 19 denotes the outer wall of the light-emitting tube.

Figure 2C:
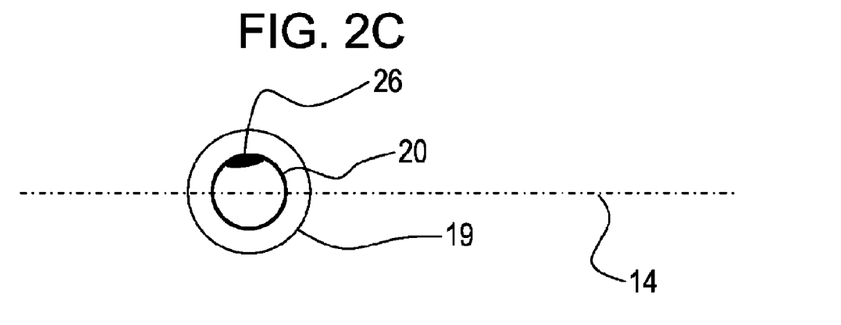
Figure 2D:
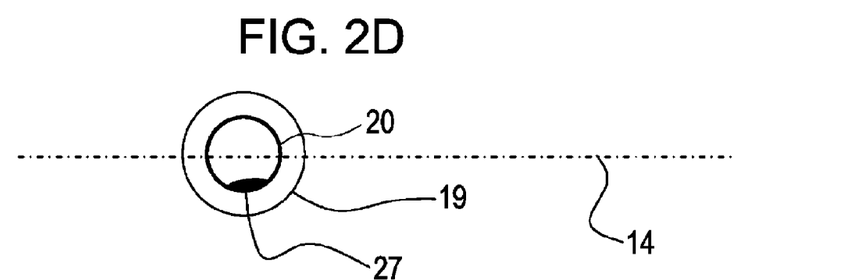

FIG. 1 illustrates light beams emitted from the light-emitting point 24 of the light source 1, the light-emitting point 24 being the furthest from the refracting optical system 2 in a direction of the illumination axis 14 among light-emitting points of the light source 1, and light beams emitted from the light-emitting point 25 that is the closest to the refracting optical system 2 in the direction of the illumination axis 14 among light-emitting points of the light source 1. A light-emitting point 26 shown in FIG. 2C is the closest to the first reflecting optical system 3 shown in FIG. 1, and is the furthest from the second reflecting optical system 4 shown in FIG. 1 among light-emitting points of the light source 1. Moreover, a light-emitting point 27 shown in FIG. 2D is the closest to the second reflecting optical system 4 shown in FIG. 1, and is the furthest from the first reflecting optical system 3 shown in FIG. 1 among light-emitting points of the light source 1. Light beams emitted from these light-emitting points 27 and 28 also illuminate the entire illumination area 5a of the object 5.

In this manner, the above-described components are disposed such that the entire illumination area 5a of the object 5 is illuminated with light beams emitted from the light source 1.

According to the structure in this exemplary embodiment, the entire illumination area 5a of the object 5 is illuminated with light beams emitted from light-emitting points on the entire surface of a cylindrical body. That is, the entire illumination area 5a of the object 5 is illuminated with all the divergent beams emitted from points of contact, serving as light-emitting points, on tangents extending from the six ends 6 to 11 of the incident surfaces of the refracting optical system 2 and the reflecting optical systems 3 and 4 to the cylindrical light-emergent surface (surface of the light-emitting tube 20).

Figure 3A:
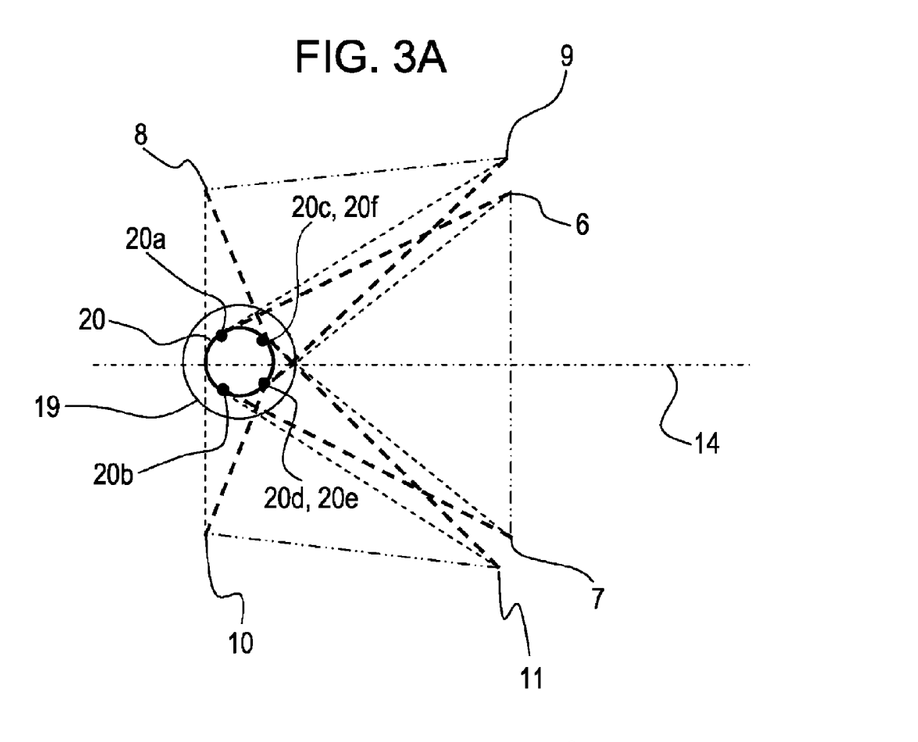
FIGS. 3A to 3C illustrate points of contacts on tangents extending from ends of incident surfaces to the surface of a light-emitting tube.

FIG. 3A illustrates the points of contacts on the tangents extending from the ends 6 to 11 of the incident surfaces to the surface of the light-emitting tube 20, i.e., light-emitting points 20a to 20f located on the surface of the light-emitting tube 20 viewed from the optical systems. These six light-emitting points 20a to 20f are especially important since light beams emitted from the light-emitting points 20a to 20f pass through the vicinity of the illumination area 5a of the object 5. In FIG. 3A, the light-emitting points 20c and the light-emitting point 20d substantially correspond to the light-emitting point 20f and the light-emitting point 20e, respectively.

Figure 3B:
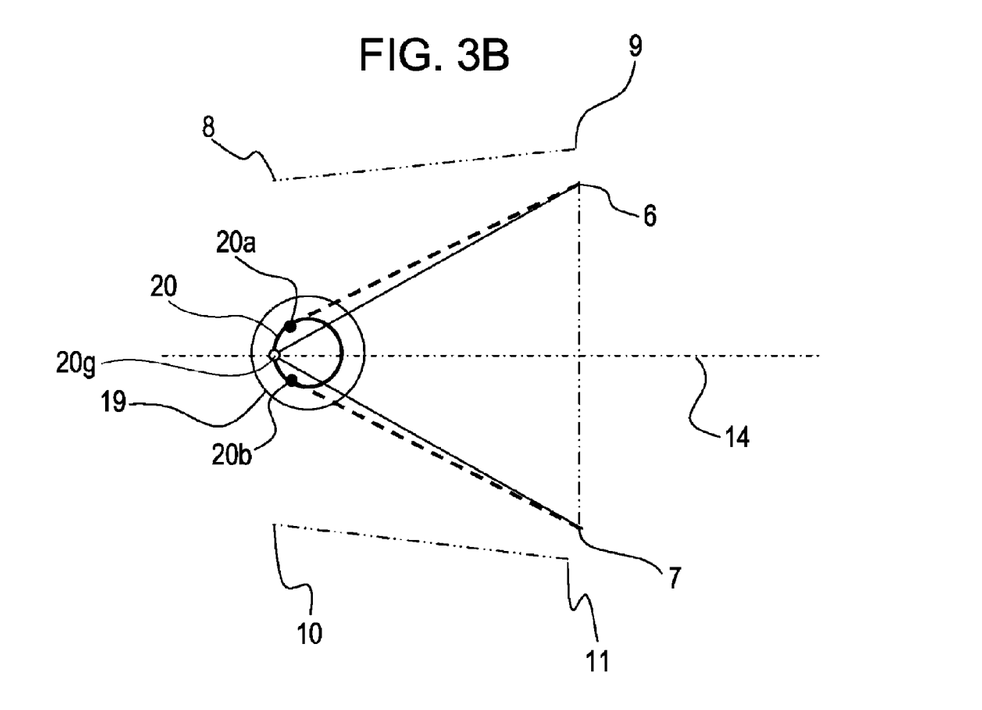
Figure 3C:
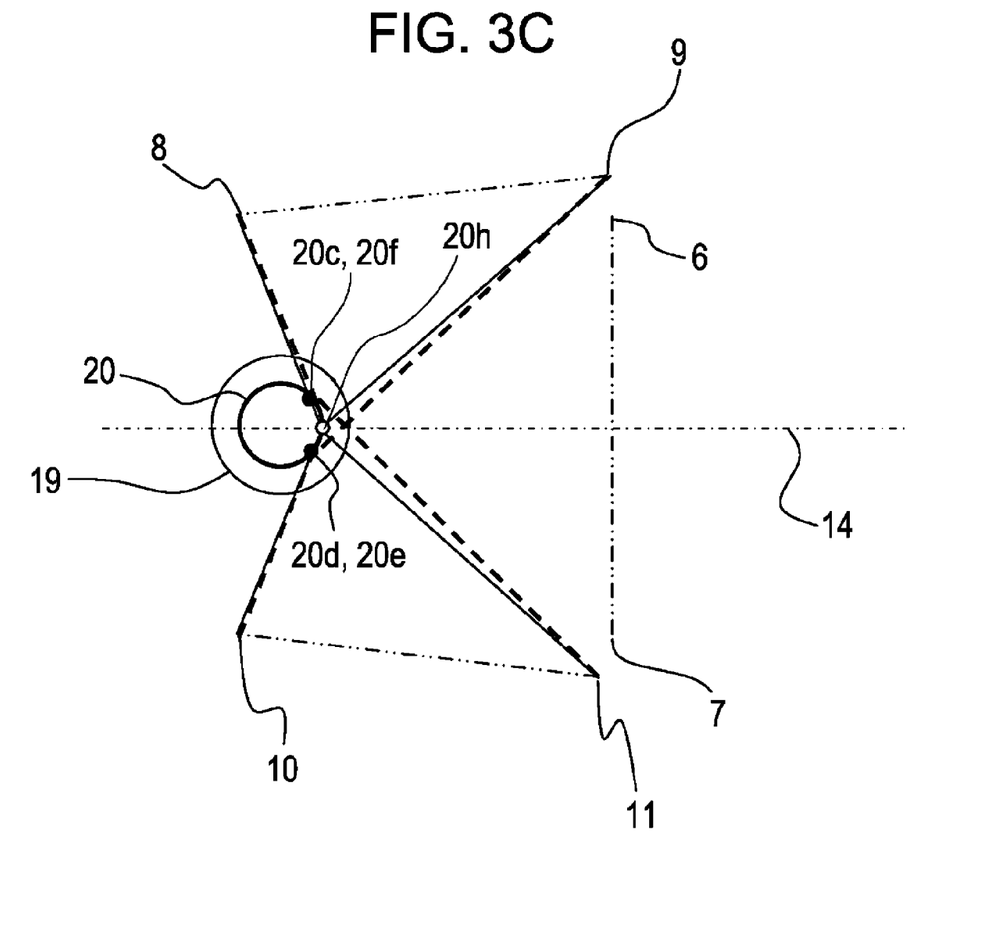

FIGS. 3B and 3C illustrate two light-emitting points 20g and 20h, respectively, that can be substantially substituted for the six light-emitting points 20a to 20f. That is, the light-emitting point 20g can be used in place of the two light-emitting points 20a and 20b, and the light-emitting point 20h can be used in place of the four light-emitting points 20c to 20f.

FIG. 3B illustrates differences in light paths when the light-emitting point 20g is used in place of the two light-emitting points 20a and 20b. As shown in FIG. 3B, angles between the illumination axis 14 and light beams emitted from the light-emitting point 20a to the end 6 are similar to those between the illumination axis 14 and light beams emitted from the light-emitting point 20g to the end 6. Moreover, angles between the illumination axis 14 and light beams emitted from the light-emitting point 20b to the end 7 are similar to those between the illumination axis 14 and light beams emitted from the light-emitting point 20g to the end 7. Therefore, the light-emitting point 20g can be used in place of the light-emitting points 20a and 20b.

FIG. 3C illustrates differences in light paths when the light-emitting point 20h is used in place of the four light-emitting points 20c to 20f. Similarly, angles between the illumination axis 14 and light beams emitted from the light-emitting point 20h to the ends 8 to 11 are similar to those between the illumination axis 14 and light beams emitted from the light-emitting points 20c to 20f to the ends 8 to 11, respectively. Therefore, the light-emitting point 20h can be used in place of the light-emitting points 20c to 20f.

As described above, the two light-emitting points 20g and 20h can be substituted for the six light-emitting points 20a to 20f located on the light-emitting tube 20 so as to efficiently illuminate the object 5 with light beams emitted from the cylindrical light-emitting tube 20. The structure can be arranged such that the entire illumination area 5a of the object 5 is illuminated with light beams emitted from the light-emitting point 20g that is the furthest from the refracting optical system 2 on the illumination axis 14 among light-emitting points of the light source 1 and from the light-emitting point 20h that is the closest to the refracting optical system 2 among light-emitting points of the light source 1.

In this exemplary embodiment, the refracting optical system 2, the first reflecting optical system 3, and the second reflecting optical system 4 each have a positive refracting power. The light-emitting points 20a to 20f of the light source 1 are located at positions slightly closer to the optical systems 2 to 4 than the positions of the focuses of the optical systems such that the entire illumination area 5a of the object 5 is illuminated with light beams emitted from the optical systems 2 to 4.

The optical systems 2 to 4 can have aspheric surfaces such that the light power distribution in the illumination area 5a of the object 5 becomes uniform.

In this exemplary embodiment, the entire illumination area 5a of the object 5 can be illuminated with light beams emitted from the light-emitting points 20a to 20f via the three optical systems 2 to 4 even when the position of a light-emitting point of the light source 1 having a cylindrical light-emergent surface varies. With this, an illuminating apparatus having a high directivity and capable of uniformly illuminating the surface of an object can be realized.

An image pickup apparatus that captures image information on the illumination area 5a of the object 5 can be provided for this exemplary embodiment. With this, an image sensing system capable of accurately detecting the illumination area 5a that is uniformly illuminated using the image information acquired by the image pickup apparatus can be built.

Second Exemplary Embodiment

Figure 4:
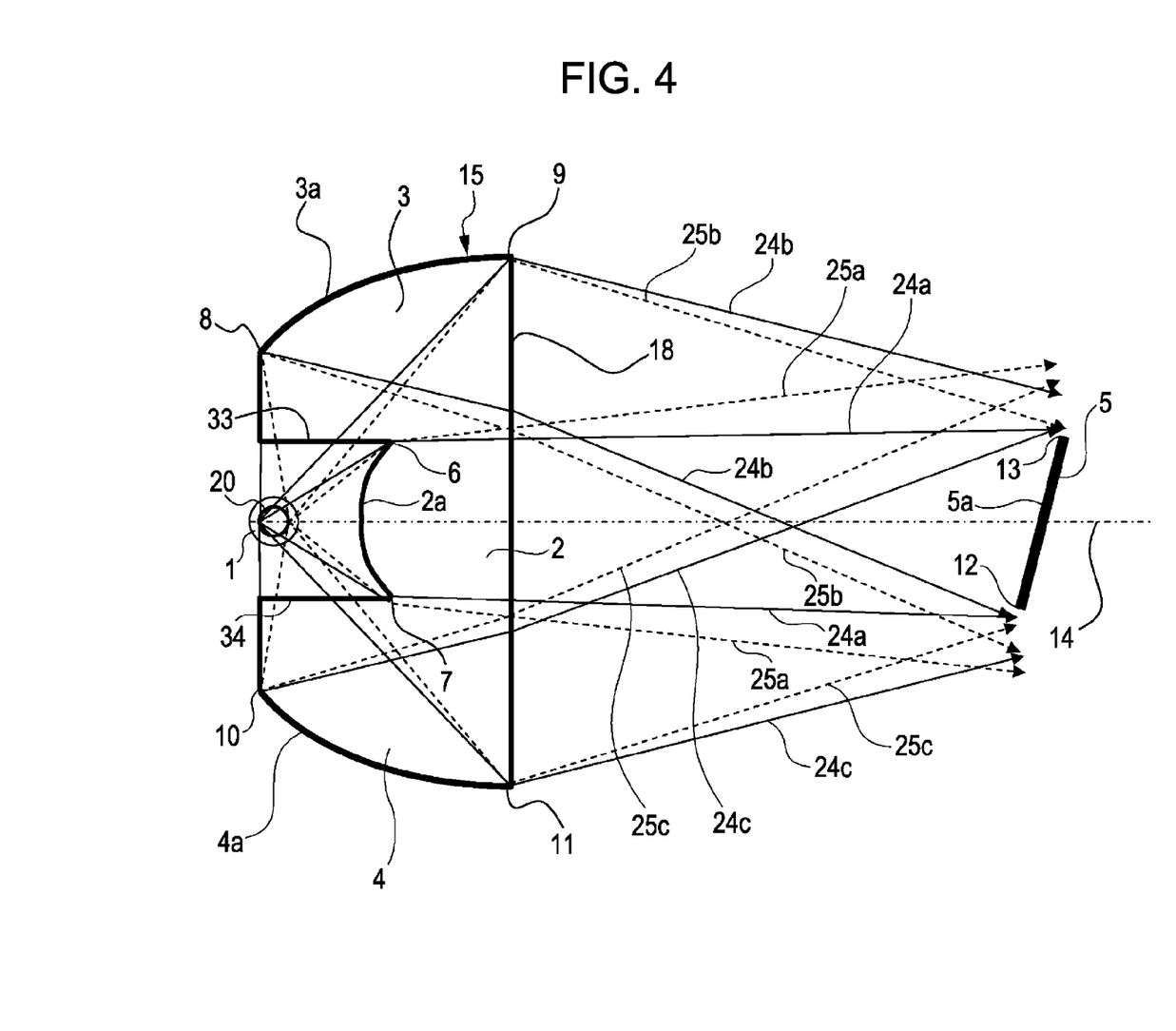
FIG. 4 illustrates an illuminating apparatus according to a second exemplary embodiment of the present invention using an integrated prism.

FIG. 4 is a cross-sectional view of a principal part of an illuminating apparatus according to a second exemplary embodiment of the present invention. The second exemplary embodiment differs from the first exemplary embodiment in that the refracting optical system 2 and the two reflecting optical systems 3 and 4 are integrated into an integrated prism 15.

The refracting optical system 2 forms a positive lens using the incident surface 2a and a first prism surface (emergent surface) 18 from which light beams are emitted. Light beams emitted from the light source 1 to the vicinity of the illumination axis 14 are incident on the object 5 via the refracting optical system 2. At this moment, the light beams 24a (solid lines) emitted from the light-emitting point 24 that is the furthest from the refracting optical system 2 and the light beams 25a (dotted lines) emitted from the light-emitting point 25 that is the closest to the refracting optical system 2 pass through both ends 6 and 7 of the incident surface 2a of the refracting optical system 2. As shown in FIG. 4, the entire illumination area 5a of the object 5 is illuminated with light beams including these light beams 24a and 25a as marginal rays.

Moreover, parts of the light beams emitted upward from the light source 1 at a large angle from the vicinity of the illumination axis 14 are refracted at a second prism surface 33 on which light beams are incident, and illuminates the object 5 via the first reflecting optical system 3. At this moment, the light beams 24b (solid lines) emitted from the light-emitting point 24 and the light beams 25b (dotted lines) emitted from the light-emitting point 25 pass through both ends 8 and 9 of the incident surface of a first reflecting surface 3a. As shown in FIG. 4, the entire illumination area 5a of the object 5 is illuminated with light beams including these light beams 24b and 25b as marginal rays.

Furthermore, parts of the light beams emitted downward from the light source 1 at a large angle from the vicinity of the illumination axis 14 are refracted at a third prism surface 34 on which light beams are incident, and illuminates the object 5 via the second reflecting optical system 4. At this moment, the light beams 24c (solid lines) emitted from the light-emitting point 24 and the light beams 25c (dotted lines) emitted from the light-emitting point 25 pass through both ends 10 and 11 of the incident surface of a second reflecting surface 4a. As shown in FIG. 4, the entire illumination area 5a of the object 5 is illuminated with light beams including these light beams 24c and 25d as marginal rays.

The second prism surface 33, the first reflecting surface 3a, and the first prism surface 18 constitute the first reflecting optical system 3. Moreover, the third prism surface 34, the second reflecting surface 4a, and the first prism surface 18 constitute the second reflecting optical system 4.

By using this integrated prism 15, the entire illumination area 5a of the object 5 can be illuminated with divergent beams emitted from the light-emitting points of the light-emitting tube 20 via the refracting optical system 2, the first reflecting optical system 3, or the second reflecting optical system 4 of the integrated prism 15.

Third Exemplary Embodiment

Figure 5A:
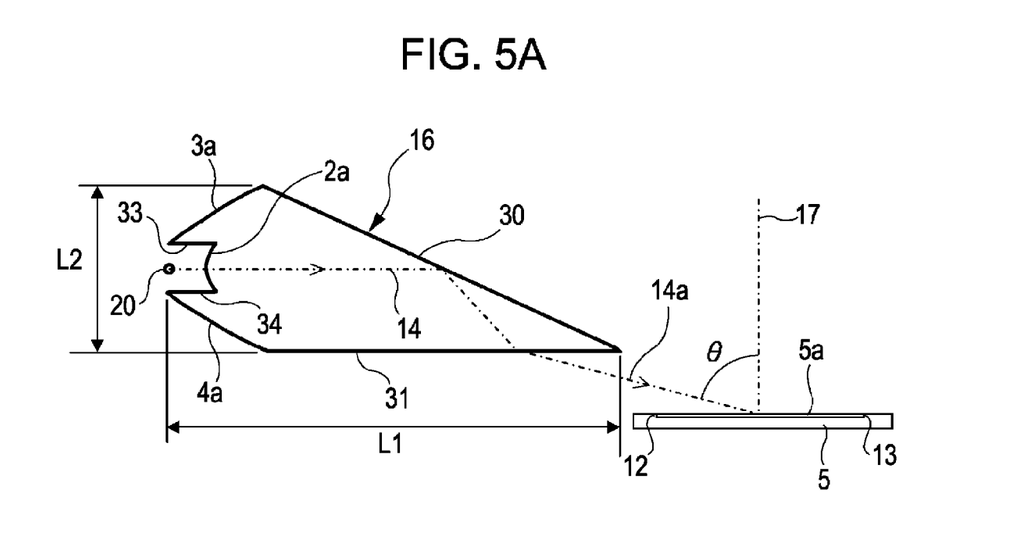
FIGS. 5A and 5B illustrate an illuminating apparatus according to a third exemplary embodiment of the present invention using an integrated prism having a directivity inclined by a large angle.
Figure 5B:
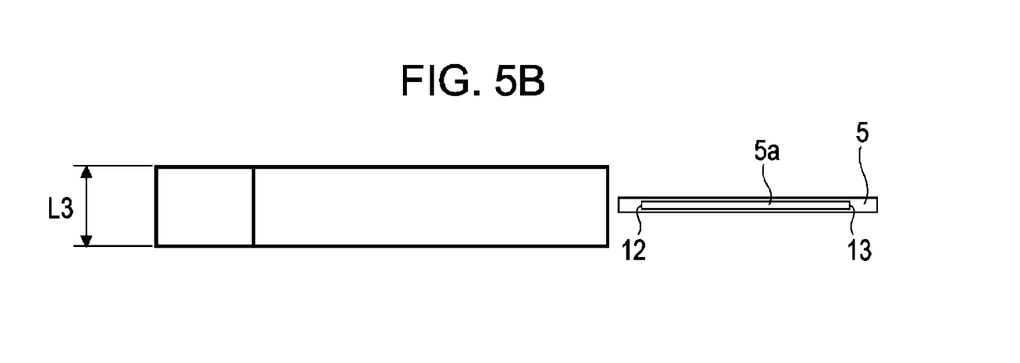

FIGS. 5A and 5B are cross-sectional views of principal parts of an illuminating apparatus according to a third exemplary embodiment of the present invention. This exemplary embodiment differs from the second exemplary embodiment in that an integrated prism 16 can be used to illuminate the object 5 with light beams having a directivity inclined by a large angle.

The structure of the integrated prism 16 according to this exemplary embodiment will now be described.

FIGS. 5A and 5B are a side view and a top view, respectively, of the integrated prism 16 and the object 5. The integrated prism 16 according to this exemplary embodiment has the following structure. That is, the refracting optical system 2 includes the incident surface 2a. Moreover, the first reflecting optical system 3 includes the first reflecting surface 3a and the second prism surface 33 on which light beams heading to the first reflecting surface 3a are incident. Moreover, the second reflecting optical system 4 includes the second reflecting surface 4a and the third prism surface 34 on which light beams heading to the second reflecting surface 4a are incident. Furthermore, the optical systems 2 to 4 include a third reflecting surface 30 that deflects the entire illuminating beams and an emergent surface (refracting surface) 31 that deflects the entire illuminating beams to a predetermined angle so as to illuminate the object 5.

The incident surface 2a, the third reflecting surface 30, and the emergent surface 31 constitute the refracting optical system 2. The second prism surface 33, the first reflecting surface 3a, the third reflecting surface 30, and the emergent surface 31 constitute the first reflecting optical system 3. The third prism surface 34, the second reflecting surface 4a, the third reflecting surface 30, and the emergent surface 31 constitute the second reflecting optical system 4.

Light beams that are incident on the first reflecting surface 3a, the second reflecting surface 4a, and the third reflecting surface 30 of the integrated prism 16 are perfectly reflected. A light beam 14a located on the illumination axis 14 among outgoing beams is emitted from the emergent surface 31 of the integrated prism 16, and enters the illumination area 5a of the object 5 at an incident angle θ. In FIG. 5A, a reference number 17 denotes a normal line in the illumination area 5a.

Figure 6A:
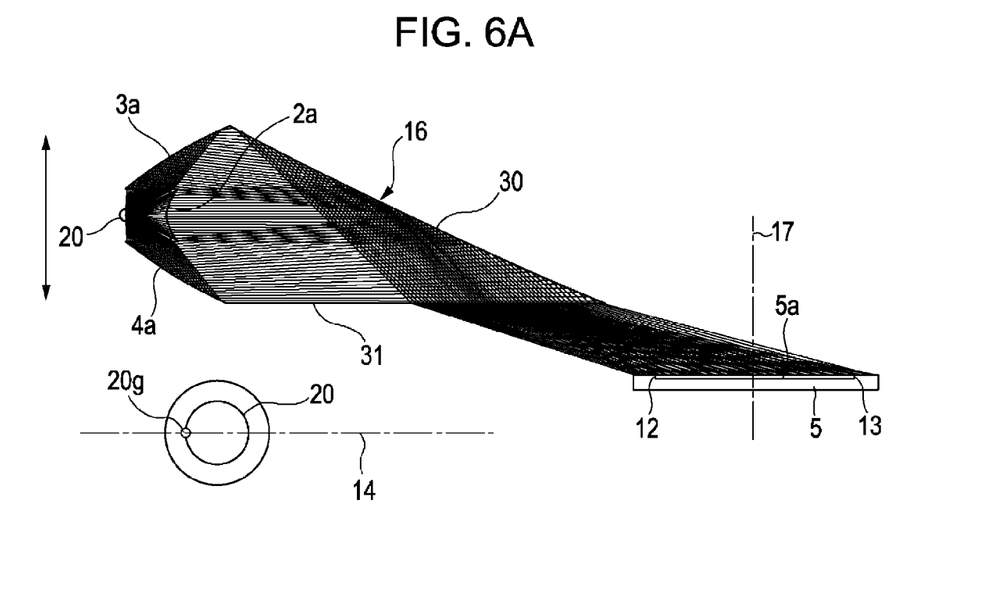
FIGS. 6A to 6G illustrate paths of light beams passing through the prism.

FIG. 6A illustrates specific paths of illuminating beams emitted from the light-emitting tube 20 and passing through the integrated prism 16 obtained using ray tracing.

The integrated prism 16 can be composed of acrylic resin. The object 5 is a rod (cylinder) having a length of 300 mm, and the illumination area 5a of 200 mm is uniformly illuminated. The length L1, the width L2, and the thickness L3 of the integrated prism 16 shown in FIGS. 5A and 5B are 550 mm, 200 mm, and 100 mm, respectively. The incident angle θ of the light beam 14a is set to 75°.

FIG. 6A illustrates a state where the entire illumination area 5a of the object 5 is illuminated with scattered beams emitted from the light-emitting point 20g that is located on the illumination axis 14 of the illumination system and is the furthest from the refracting optical system 2. All the light paths via the refracting optical system 2, the first reflecting optical system 3, and the second reflecting optical system 4 are displayed.

Figure 6B:
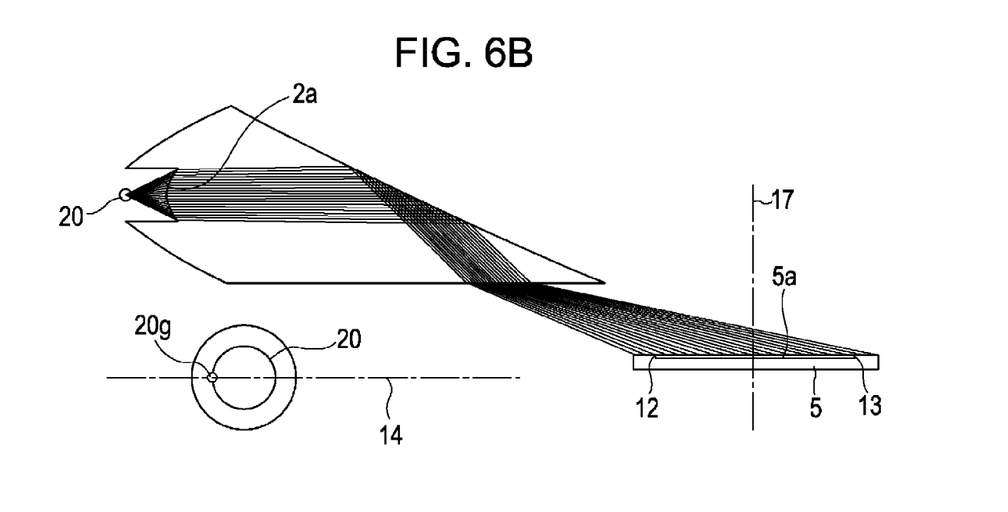
Figure 6C:
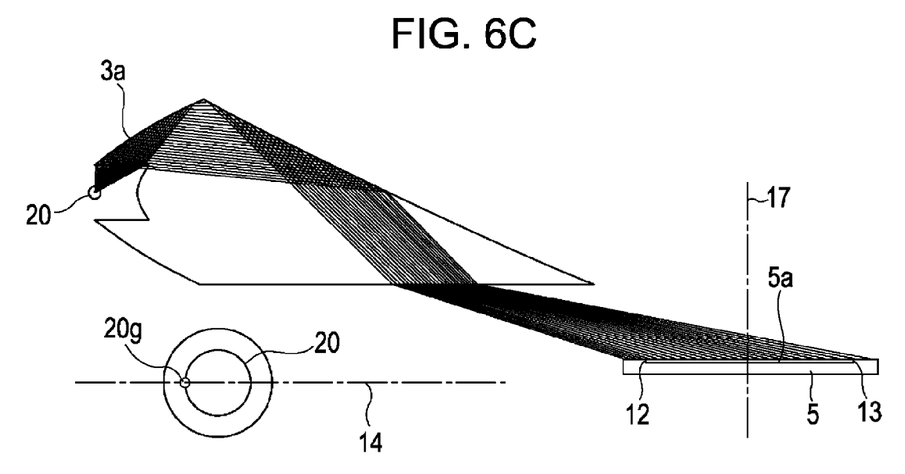
Figure 6D:
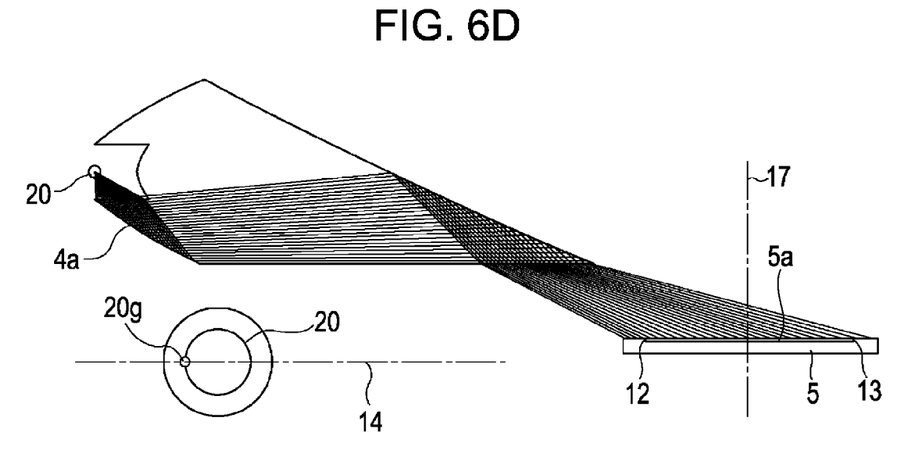

FIG. 6B illustrates light paths only via the refracting optical system 2 shown in FIG. 5A. FIG. 6C illustrates light paths only via the first reflecting optical system 3 shown in FIG. 5A. FIG. 6D illustrates light paths only via the second reflecting optical system 4 shown in FIG. 5A. As shown in FIGS. 6B to 6D, the entire illumination area 5a is substantially uniformly illuminated with the light beams on the paths of each case.

Figure 6E:
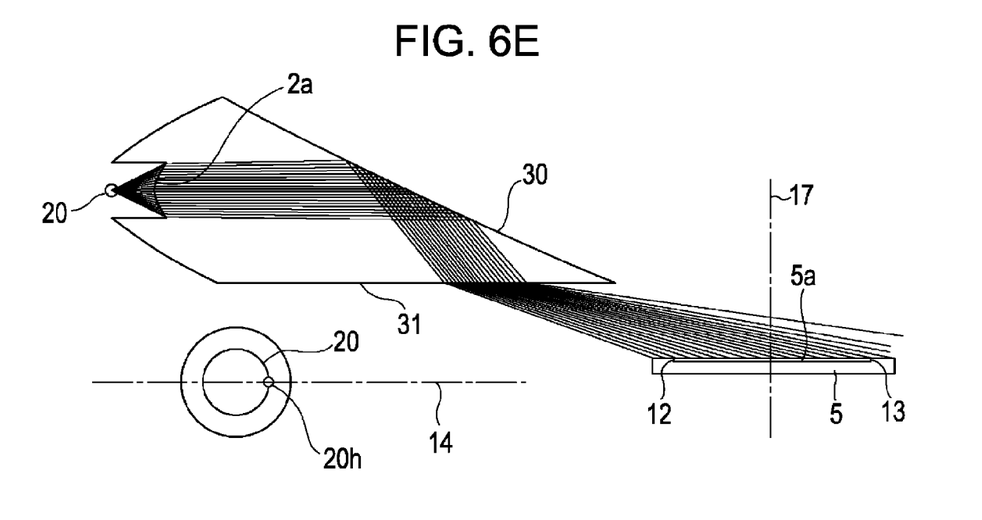
Figure 6F:
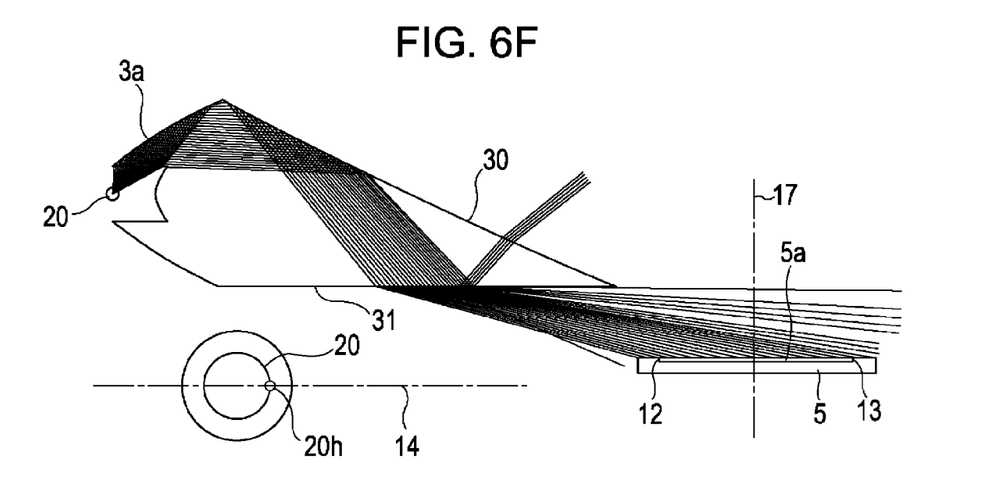
Figure 6G:
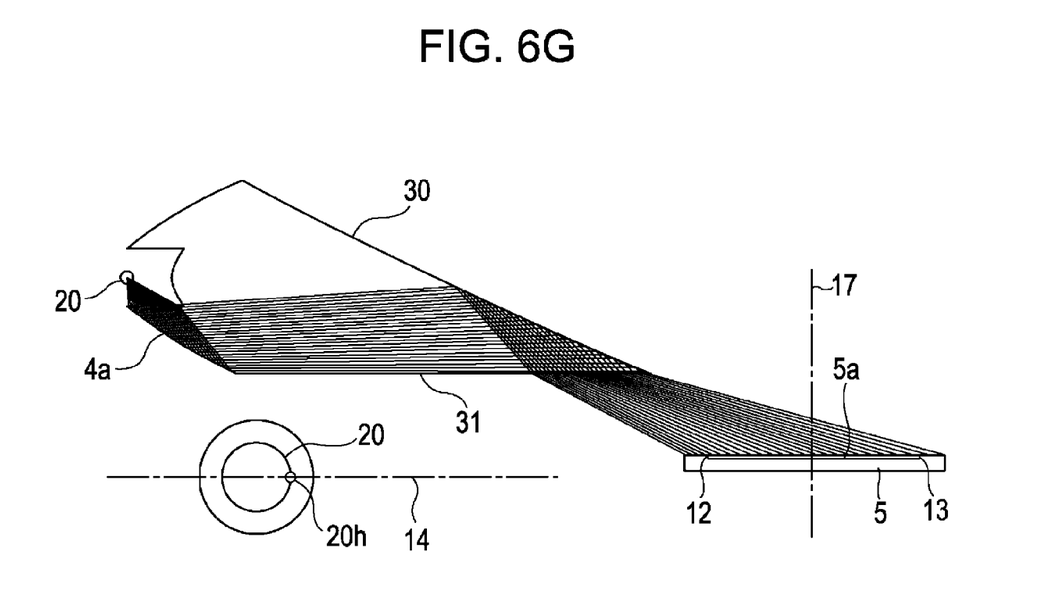

FIGS. 6E to 6G illustrate states where the entire illumination area 5a of the object 5 is illuminated with scattered beams emitted from the light-emitting point 20h that is located on the illumination axis 14 of the illumination system and is the closest to the refracting optical system 2.

FIG. 6E illustrates light paths only via the refracting optical system 2. FIG. 6F illustrates light paths only via the first reflecting optical system 3. FIG. 6G illustrates light paths only via the second reflecting optical system 4. As shown in FIGS. 6E to 6G, the entire illumination area 5a is substantially uniformly illuminated with the light beams on the paths of each case. In FIG. 6F, part of the light beams is perfectly reflected from the emergent surface 31, and is not directed to the object 5. However, the illumination area 5a is substantially uniformly illuminated.

In this exemplary embodiment, an illuminating system can be formed using a cylindrical body having a shape identical or substantially identical to the light-emitting tube 20 of the light source 1 as the object 5. With this, the narrow illumination area 5a of the object 5 can be easily illuminated in an oblique direction in a uniform manner. Moreover, the image information on the illumination area 5a of the object 5 can be captured using an image pickup apparatus. With this, the image information on the illumination area 5a that is uniformly illuminated can be accurately detected.

Fourth Exemplary Embodiment

Figure 7A:
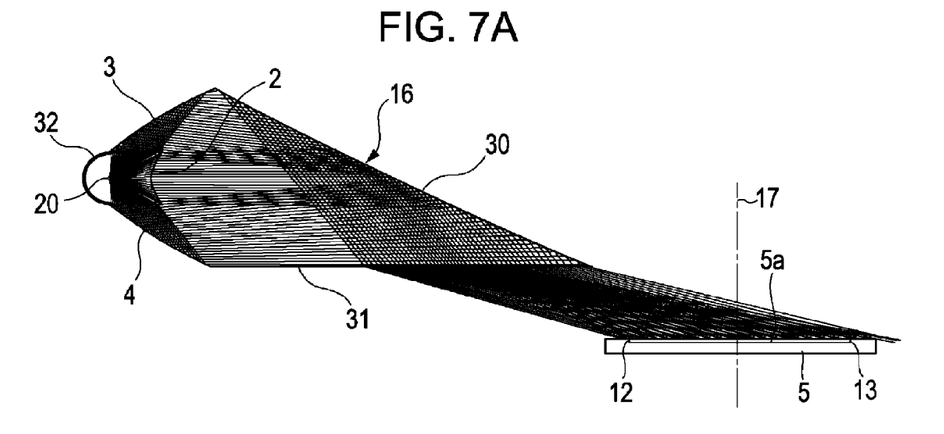
FIGS. 7A and 7B illustrate an illuminating apparatus according to a fourth exemplary embodiment of the present invention using an integrated prism having an additional optical system for increasing light power.
Figure 7B:
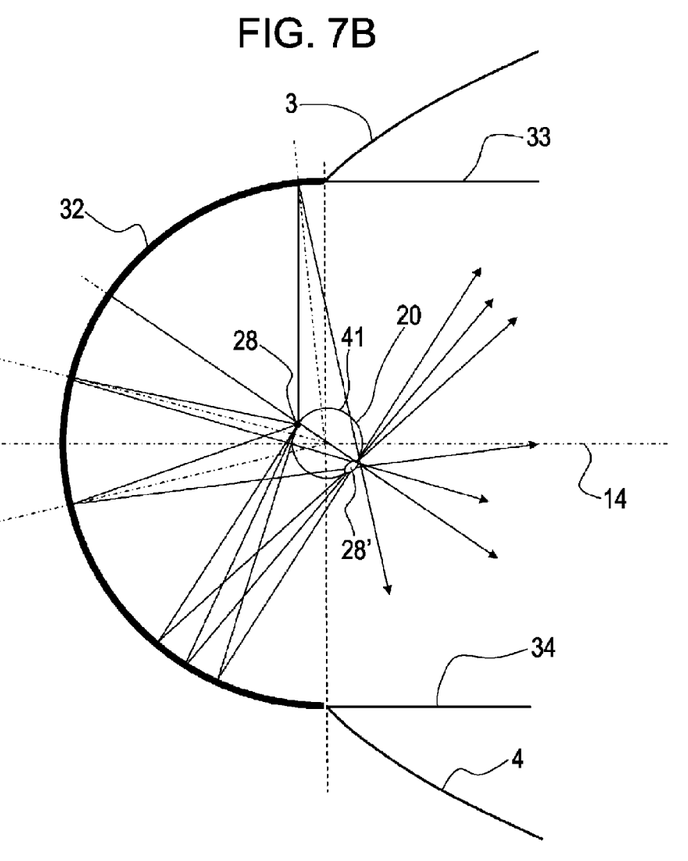

FIGS. 7A and 7B are cross-sectional views of principal parts of an illuminating apparatus according to a fourth exemplary embodiment of the present invention. The fourth exemplary embodiment differs from the third exemplary embodiment in that a fourth reflecting surface 32 is provided so as to reflect light beams scattered backward from the light-emitting tube 20 forward.

FIG. 7B illustrates a state where light beams scattered backward from the surface of the light-emitting tube 20 are reflected from the fourth reflecting surface 32. The fourth reflecting surface 32 is formed of a cylindrical mirror disposed coaxially with the inner wall 41 of the cylindrical light-emitting tube. Light beams scattered backward from a light-emitting point 28 with arbitrary angles are focused on a point, serving as a virtual light source, located on the light-emitting tube 20 opposite to the light-emitting point 28, and then are scattered from the point. In this manner, light beams scattered backward from light-emitting points on the surface of the light-emitting tube 20 can be reflected forward as illuminating beams in this optical system.

Effects of glass of the light-emitting tube 20 are not described above. However, the effects of refraction of the glass tube are usually small. When it is necessary to control a delicate distribution, the effects can be considered in a detailed design.

Figure 8:
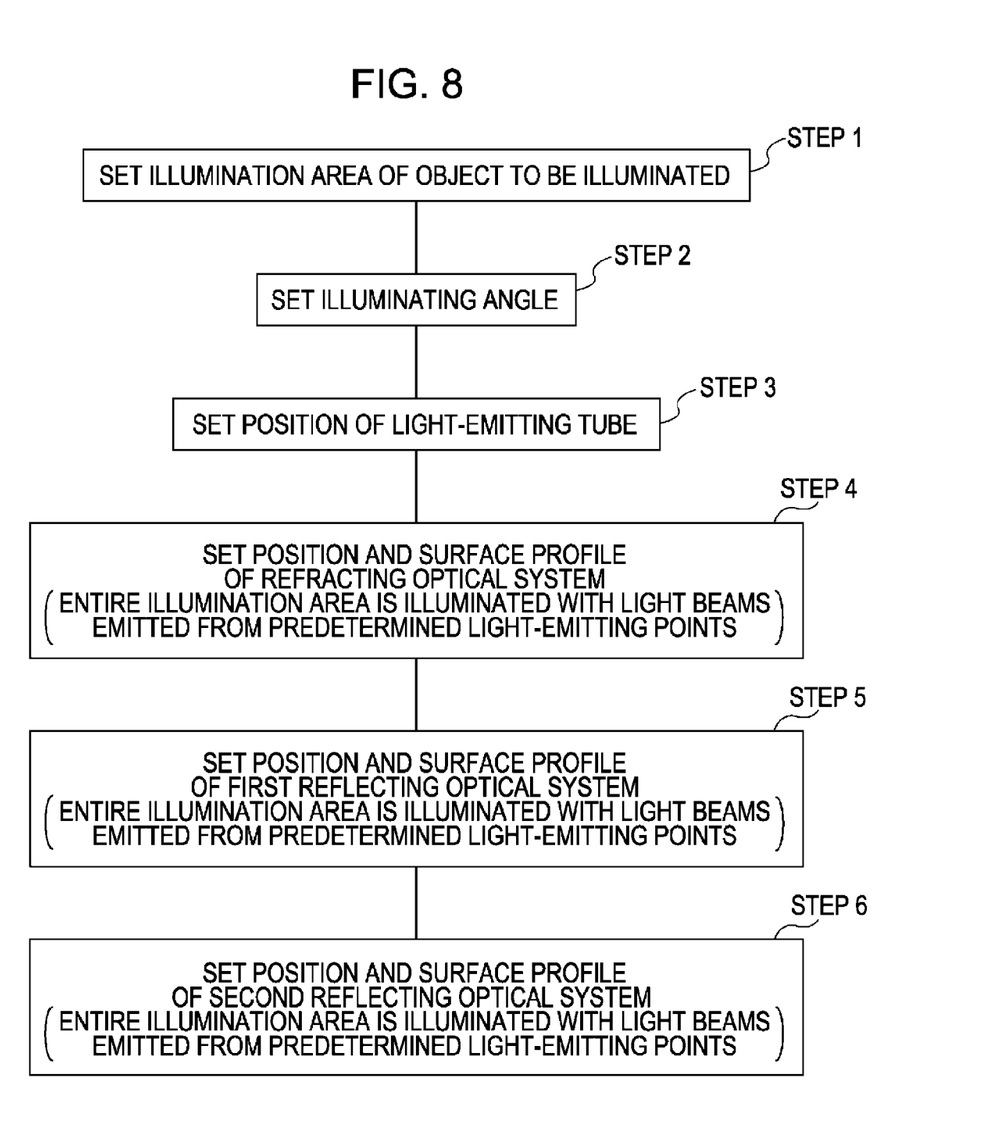
FIG. 8 is a flow chart of designing the illuminating apparatuses according to the exemplary embodiments of the present invention.

FIG. 8 is a flow chart of designing the illuminating apparatuses according to the exemplary embodiments of the present invention.

First, the illumination area (illumination range) of the object to be illuminated is set in Step 1. In Step 2, an illuminating angle is set. In Step 3, the position of the light-emitting tube is set. After these parameters are set, the position and the surface profile of the refracting optical system is set in Step 4. In Step 4, the most distal light-emitting point and the most proximal light-emitting point are set such that the entire illumination area is illuminated. In Step 5, the position and the surface profile of the first reflecting optical system are set. In Step 5, the most distal light-emitting point and the most proximal light-emitting point are also set such that the entire illumination area is illuminated. Finally, the position and the surface profile of the second reflecting optical system are set in Step 6. In Step 6, the most distal light-emitting point and the most proximal light-emitting point are also set such that the entire illumination area is illuminated. Through these designing steps, an illuminating apparatus capable of efficiently illuminating an illumination area of an object to be illuminated with a high directivity even when the position of a light-emitting point on a cylindrical light-emitting tube is changed in terms of time can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2006-168716 filed Jun. 19, 2006, which is hereby incorporated by reference herein in its entirety.

What is claimed is:

1. An illuminating apparatus comprising:
a light source including a cylindrical light-emitting tube;
a prism, the prism including:
a first optical system having a first incident surface, which faces the light source such that light emitted from the light source to an object to be illuminated is incident on the first incident surface, an emergent surface, which is oriented with respect to the first incident surface such that the light passing through the first incident surface is emitted through the emergent surface, and a first reflecting surface, which is oriented opposite to the first incident surface such that the first reflecting surface reflects the light incident from the first incident surface to the emergent surfaced; and
a second optical system having a second incident surface, which is connected to the first incident surface and is oriented with respect to the light source such that light emitted from the light source is also incident on the second incident surface, and a second reflecting surface, which is connected to the second incident surface such that the second reflecting surface reflects the light incident from the second incident surface to the first reflecting surface, wherein the light emitted from the light source and reflected on the first reflecting surface is emitted from the emergent surface; and
a third optical system having a third incident surface, which is connected to the first incident surface and is oriented with respect to the light source such that light emitted from the light source is also incident on the third incident surface, and a third reflecting surface, which is connected to the third incident surface such that the light incident from the third incident surface is reflected by the third reflecting surface to the first reflecting surface, wherein the light emitted from the light source and reflected on the first reflecting surface is emitted from the emergent surface,
wherein the first optical system, the second optical system, and the third optical system are integrally included in the prism and each configured to illuminate the entire illumination area of the object so as to superpose each light via the first, second, and third optical systems.

2. The illuminating apparatus according to claim 1, wherein the first optical system, the second optical system, and the third optical system are configured to illuminate the entire illumination area of the object with light emitted from a light-emitting point that is the furthest from the incident surface of the first optical system and a light-emitting point that is the closest to the incident surface of the first optical system so as to superpose each light via the first, second, and third optical systems.

3. The illuminating apparatus according to claim 1, wherein the first optical system, the second optical system, and the third optical system each have a positive refracting power.

4. The illuminating apparatus according to claim 3, wherein light-emitting points located on a surface of the light-emitting tube viewed from the first optical system, the second optical system, and the third optical system are each located at a position closer to the corresponding first, second, and third optical systems than a position of a focus of the corresponding first, second, and third optical systems.

5. The illuminating apparatus according to claim 1, wherein the first optical system, the second optical system, and the third optical system illuminate the object in a direction oblique to a normal line of the object.

6. An image sensing system comprising:
illuminating apparatus according to claim 1; and
an image pickup apparatus configured to capture images of an object illuminated by the illuminating apparatus.

* * * * *